US011414337B2

(12) United States Patent
Anderson

(10) Patent No.: US 11,414,337 B2
(45) Date of Patent: Aug. 16, 2022

(54) FORMING GLASS CONTAINERS FROM TUBULAR PARISONS

(71) Applicant: Owens-Brockway Glass Container Inc., Perrysburg, OH (US)

(72) Inventor: Walter Anderson, Maumee, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 246 days.

(21) Appl. No.: 16/555,680

(22) Filed: Aug. 29, 2019

(65) Prior Publication Data

US 2021/0061696 A1 Mar. 4, 2021

(51) Int. Cl.
| | |
|---|---|
| *C03B 13/14* | (2006.01) |
| *C03B 7/086* | (2006.01) |
| *C03B 7/088* | (2006.01) |
| *C03B 13/16* | (2006.01) |
| *B65D 1/02* | (2006.01) |
| *C03B 9/193* | (2006.01) |

(52) U.S. Cl.
CPC .............. *C03B 13/14* (2013.01); *B65D 1/02* (2013.01); *C03B 7/086* (2013.01); *C03B 7/088* (2013.01); *C03B 9/1932* (2013.01); *C03B 13/16* (2013.01)

(58) Field of Classification Search
CPC ................ B29C 43/461; B29C 2043/466
See application file for complete search history.

(56) References Cited

U.S. PATENT DOCUMENTS

| | | | | |
|---|---|---|---|---|
| 1,579,666 | A | * | 4/1926 | Showers ................. C03B 13/02 65/253 |
| 1,911,529 | A | * | 5/1933 | Peiler ...................... C03B 7/086 65/330 |
| 2,009,326 | A | | 7/1935 | Sanchez-Vello |
| 2,187,432 | A | * | 1/1940 | Powers ............... C03B 19/1075 65/142 |
| 2,316,749 | A | * | 4/1943 | Powers ................. C03B 13/14 65/22 |
| 2,371,213 | A | * | 3/1945 | Batchell ................... C03B 3/02 65/142 |

(Continued)

FOREIGN PATENT DOCUMENTS

| | | |
|---|---|---|
| BE | 403663 A | 6/1934 |
| DE | 102008005931 A | 7/2009 |

(Continued)

OTHER PUBLICATIONS

International Search Report and Written Opinion, Int Serial No. PCT/US2020/048374, Int. Filing Date: Aug. 28, 2020, Applicant: Owens-Brockway Glass Container Inc., dated Nov. 9, 2020.

(Continued)

*Primary Examiner* — Erin Snelting

(57) ABSTRACT

A method and apparatus for forming a glass parison are disclosed. The method of forming a glass container in accordance with one aspect of the disclosure includes flowing molten glass to a glass feeder spout located immediately upstream of die rollers; feeding molten glass through an annular space established between an orifice ring of the glass feeder spout and a plunger of the glass feeder spout; blowing gas through the plunger into the molten glass to form a continuous tube of molten glass; and die rolling the continuous tube into a continuous string of glass containers.

17 Claims, 5 Drawing Sheets

(56) References Cited

U.S. PATENT DOCUMENTS

| | | | |
|---|---|---|---|
| 2,765,586 A | | 10/1956 | Wilson |
| 2,918,698 A | | 12/1959 | Hagen et al. |
| 2,991,500 A | | 7/1961 | Hagen |
| 3,035,302 A | * | 5/1962 | Lysobey ................ B29C 49/38 425/371 |
| 3,401,028 A | * | 9/1968 | Morrill, Jr. ............. C03B 17/04 65/192 |
| 3,884,668 A | * | 5/1975 | Suzuki ................... C03B 17/04 65/142 |
| 3,907,476 A | | 9/1975 | Reilly |
| 4,191,723 A | | 3/1980 | Vargiu et al. |
| 4,253,862 A | * | 3/1981 | Kobayashi ............... C03B 7/08 65/132 |
| 4,261,706 A | | 4/1981 | Blanding et al. |
| 4,451,418 A | | 5/1984 | Furuta et al. |
| 4,525,194 A | | 6/1985 | Rudoi |
| 5,895,512 A | * | 4/1999 | Dominitz .............. C03B 17/025 65/126 |
| 6,301,932 B1 | * | 10/2001 | Allen ..................... C03B 13/14 65/106 |
| 7,594,530 B1 | | 9/2009 | Tucker |
| 8,464,554 B2 | | 6/2013 | Fredholm et al. |
| 8,475,153 B2 | | 7/2013 | Finetti et al. |
| 8,713,972 B2 | | 5/2014 | Lakota et al. |
| 9,139,464 B2 | | 9/2015 | Bartsch et al. |
| 9,643,872 B2 | | 5/2017 | Fredholm |
| 2001/0055930 A1 | * | 12/2001 | Ott .......................... C03C 3/095 65/59.27 |
| 2003/0051506 A1 | | 3/2003 | Schafer et al. |
| 2004/0016262 A1 | * | 1/2004 | Zandvliet ................ C03B 11/02 65/121 |
| 2007/0071956 A1 | | 3/2007 | Zou |
| 2017/0230078 A1 | | 9/2017 | Domori et al. |
| 2017/0327401 A1 | | 11/2017 | Fredholm |

FOREIGN PATENT DOCUMENTS

| | | | | |
|---|---|---|---|---|
| FR | 1311148 A | | 12/1962 | |
| JP | S645918 A | | 1/1989 | |
| JP | 08011227 A | * | 1/1996 | ........... B29C 51/225 |
| JP | 2011046549 A | | 3/2011 | |
| JP | 2012056785 A | | 3/2012 | |
| WO | WO9924552 A1 | | 5/1999 | |

OTHER PUBLICATIONS

Written Opinion of the International Preliminary Examining Authority, Int. Application No. PCT/US2020/048374, Int. Filing Date: Aug. 28, 2020, Applicant: Owens-Brockway Glass Container Inc., dated Oct. 13, 2021.

* cited by examiner

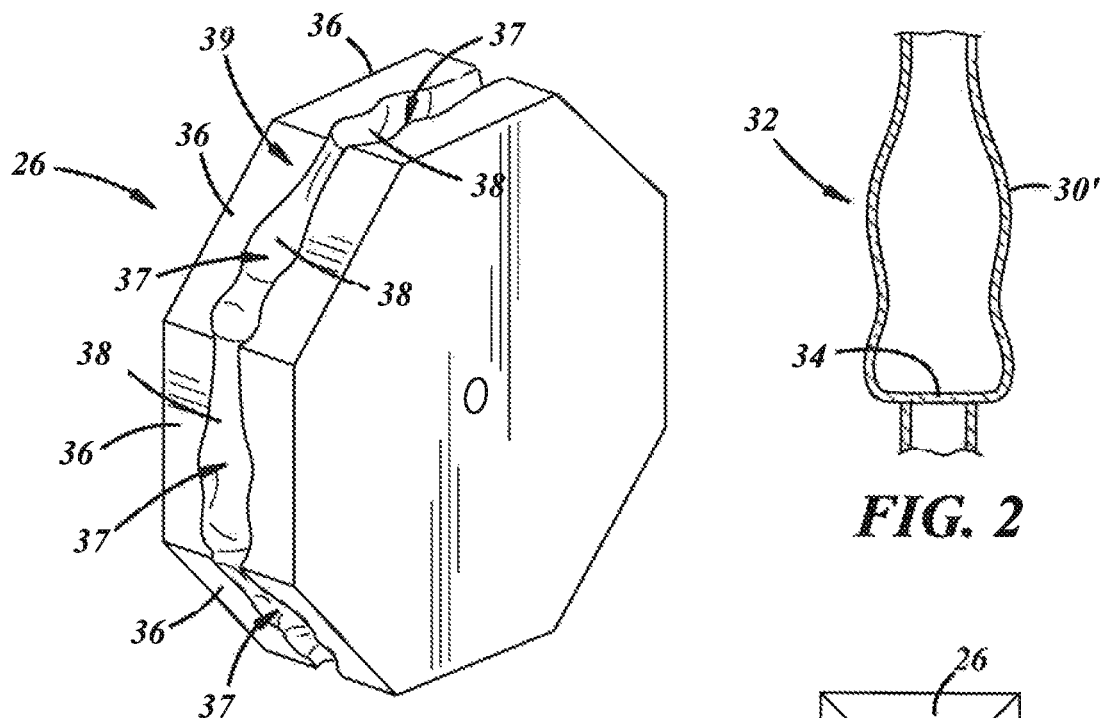
FIG. 3
FIG. 2
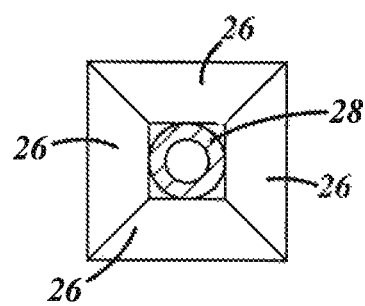
FIG. 6
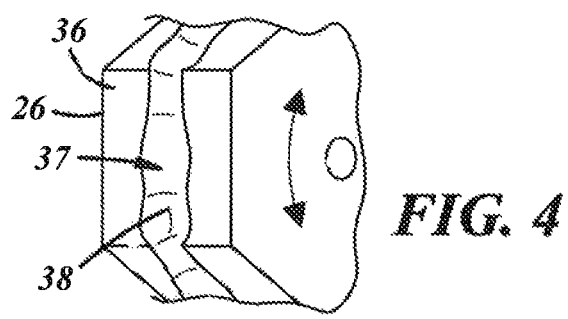
FIG. 4
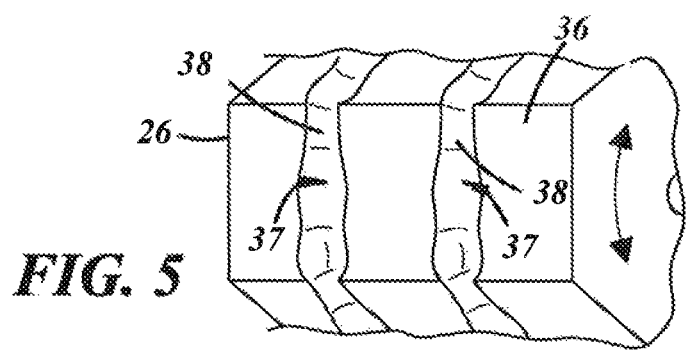
FIG. 5

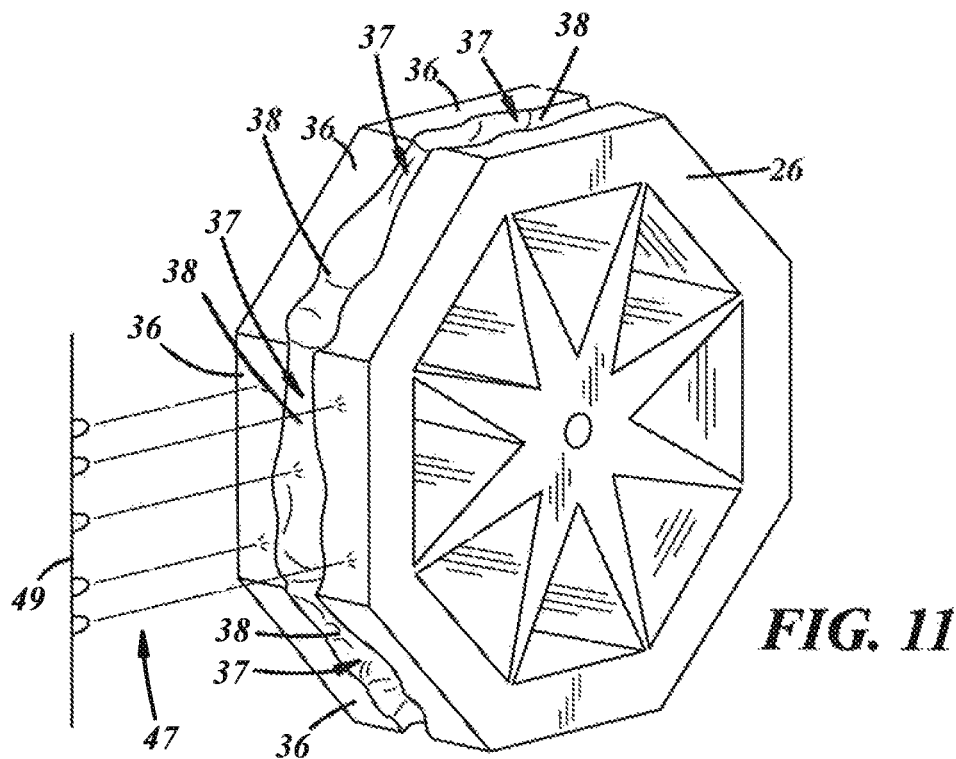

*FIG. 11*

```
                    ┌─────────────────────────────────────────────┐
  100               │ Flow molten glass to glass feeder spout     │──110
   ╲                │ located immediately upstream of die rollers │
    ╲               └─────────────────────────────────────────────┘
                                       │
                    ┌─────────────────────────────────────────────┐
                    │ Feed molten glass through annular space     │──120
                    │ between orifice ring and plunger            │
                    └─────────────────────────────────────────────┘
                                       │
                    ┌─────────────────────────────────────────────┐
                    │ Blow gas through plunger into molten glass  │──130
                    │ to form continuous tubular parison          │
                    └─────────────────────────────────────────────┘
                                       │
                    ┌─────────────────────────────────────────────┐
                    │ Die roll continuous tubular parison into    │──140
                    │ continuous string of glass containers       │
                    └─────────────────────────────────────────────┘
                                       │
                    ┌─────────────────────────────────────────────┐
                    │ Apply vacuum through die rollers to assist  │──150
                    │ with shaping glass containers               │
                    └─────────────────────────────────────────────┘
                                       │
                    ┌─────────────────────────────────────────────┐
                    │ Cool die rollers by rolling them through    │──160
                    │ a liquid bath                               │
                    └─────────────────────────────────────────────┘
```

*FIG. 12*

FORMING GLASS CONTAINERS FROM TUBULAR PARISONS

TECHNICAL FIELD

This patent application discloses systems and methods for glass container manufacturing, and more particularly, systems and methods for forming a glass container or parison from molten glass.

BACKGROUND

A parison can include a partially-shaped mass of molten glass formed after melting in a glass furnace and prior to forming a finished container. Glass container manufacturing processes can include melting glass in the furnace, feeding the molten glass into a blank mold to form the parison, opening the blank mold and inverting the parison while transferring the parison to an open blow mold, closing the blow mold, and blowing the parison against internal walls of the blow mold to form a finished container.

BRIEF SUMMARY OF THE DISCLOSURE

The present disclosure embodies a number of aspects that can be implemented separately from or in combination with each other.

A method of forming a glass container in accordance with one aspect of the disclosure includes flowing molten glass to a glass feeder spout located immediately upstream of die rollers; feeding molten glass through an annular space established between an orifice ring of the glass feeder spout and a plunger of the glass feeder spout; blowing gas through the plunger into the molten glass to form a continuous tube of the molten glass; and die rolling the continuous tube into a continuous string of glass containers.

A glass container forming apparatus in accordance with one aspect of the disclosure includes a feeder spout including a heated orifice ring; a plunger carried in the feeder spout and including a blow conduit therethrough; and die rollers immediately downstream of the heated orifice ring, with no chutes, scoops, or other gob handling devices therebetween.

A glass container forming system in accordance with one aspect of the disclosure includes a glass feeder; and glass container forming apparatus configured to receive molten glass from the glass feeder, the glass container forming apparatus including a feeder spout including a heated orifice ring; a plunger carried in the feeder spout and including a blow conduit therethrough; and die rollers immediately downstream of the heated orifice ring, with no chutes, scoops, or other gob handling devices therebetween.

BRIEF DESCRIPTION OF THE DRAWINGS

The disclosure, together with additional objects, features, advantages and aspects thereof, will be best understood from the following description, the appended claims and the accompanying drawings, in which:

FIG. 2 is a fragmentary side view of a parison according to an illustrative embodiment of the present disclosure that may be produced by the glass container forming system and glass container forming apparatus illustrated in FIG. 1;

FIG. 3 is an isometric view showing a die roller according to an illustrative embodiment of the present disclosure that may be used in the glass container forming system and glass container forming apparatus illustrated in FIG. 1;

FIG. 4 is a fragmentary isometric view of a die roller showing one cavity per face according to an illustrative embodiment of the present disclosure that may be used by the glass container forming system and glass container forming apparatus illustrated in FIG. 1;

FIG. 5 is a fragmentary isometric view of a die roller showing two cavities per face according to an illustrative embodiment of the present disclosure that may be used by the glass container forming system and glass container forming apparatus illustrated in FIG. 1;

FIG. 6 is a top plan view of a set of four die rollers forming a glass container from a tubular parison according to an illustrative embodiment of the present disclosure, where the die rollers may be used by the glass container forming system and glass container forming apparatus illustrated in FIG. 1;

FIG. 11 is an isometric view of a die roller and a discharge device according to an illustrative embodiment of the present disclosure, where the die roller may be used by the glass container forming system and glass container forming apparatus illustrated in FIG. 1; and FIG. 12 is a flow diagram showing various steps of an illustrative embodiment of a method for forming a glass container from a continuous tube of molten glass using the glass container forming system and glass container forming apparatus illustrated in FIG. 1.

DETAILED DESCRIPTION

Figure 1:
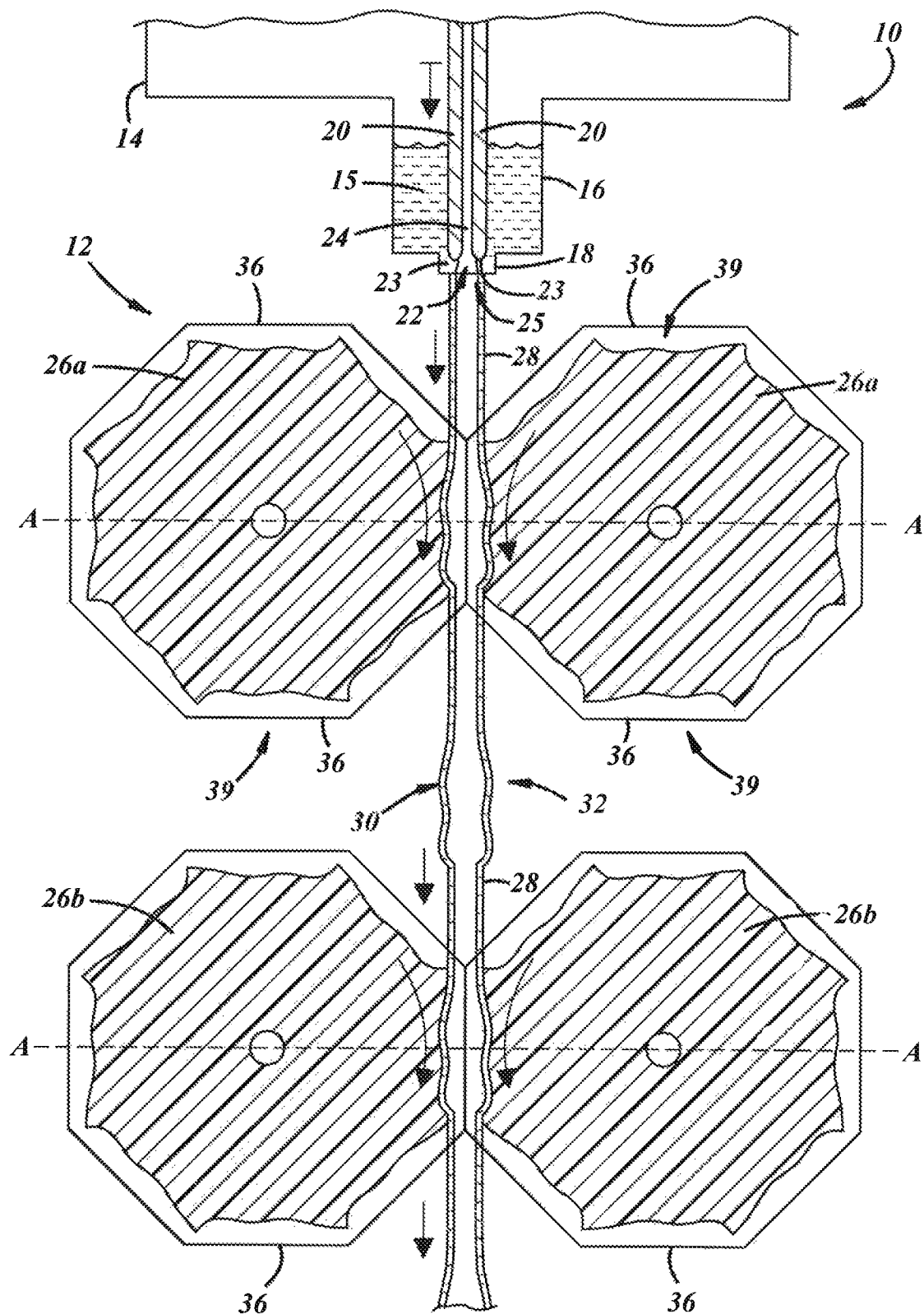
FIG. 1 is a fragmentary cross-sectional view of a glass container forming system and glass container forming apparatus forming a glass container from a tubular parison using die rollers in accordance with an illustrative embodiment of the present disclosure.

A general object of the present disclosure, in accordance with at least one aspect of the disclosure, is to provide an apparatus, a system, and method for forming glass containers from a continuous tube of molten glass using die rollers located immediately downstream of a glass feeder spout.

Silica-based glass (e.g., soda-lime-silica glass) as well as other types of glass are prevalent in the manufacture of glass containers and other articles. Molten glass used to make such articles can be conventionally prepared by reacting and melting a batch of glass-forming materials in a refractory-lined, continuously-operated glass furnace, tank, and/or pot, for example an Advanced Submerged Combustion (ASC) melter. The batch of glass-forming materials is typically introduced into the furnace by being deposited into a pool of molten glass already in the furnace. The batch is gradually melted into the pool by continuous application of heat. After the batch has been melted, refined, and homogenized within the furnace, the resulting molten glass is typically directed to one or more forehearths where it is thermally conditioned by being cooled to a suitable temperature for forming. A feeder located at a downstream end of the one or more forehearths can be used to measure out and form predetermined amounts of molten glass, which can be delivered to an individual section machine. The molten glass is then formed into parisons and, subsequently, individual glass articles using a glass forming machine. Conventional equipment generally requires the use of a blank mold to form a parison from a glass gob. However, using a blank mold to form a parison from a glass gob is not a continuous process, but instead requires each charge of molten glass to individually be gathered by or delivered to a machine.

Consequently, the present disclosure is directed to an apparatus, a system, and a method that forms glass containers from a continuous tube of molten glass and die rollers located immediately downstream from a feeder spout that has a plunger with a blow conduit. The apparatus, system, and method provide for continuous production of glass containers using the tubular glass parison instead of forming a parison from a charge of molten glass. Moreover, the apparatus, system, and method may be entirely under process control and independent of physical blank molds, which provides cost saving by eliminating conventional molding and gob delivery equipment. Further, the apparatus and method disclosed herein may provide the ability to dynamically change parison characteristics, which in turn can provide the advantage of rapid job changes and the opportunity to optimize or tune vertical and/or circumferential glass thickness distribution in real time by way of modulating the plunger and blow air. By forming the glass containers from a continuous tube of molten glass using the die rollers, the need for a conventional blank mold to form parisons and glass containers can be eliminated.

Referring generally to FIGS. 1 through 7, a glass container forming system 10 and a glass container forming apparatus 12 is shown in accordance with an illustrative embodiment of the present disclosure. The glass container forming system 10 can comprise a glass feeder 14 and a glass container forming apparatus 12 configured to receive molten glass from the glass feeder 14. The glass container forming apparatus 12 can include a feeder spout 16, a plunger 20 carried in the feeder spout 16, and at least one die roller 26 disposed immediately downstream of the feeder spout 16.

As illustrated in FIG. 1, the glass container forming system 10 can include a glass feeder 14 that provides molten glass 15 and controls the temperature and quantity of the molten glass 15 as it flows from the working end of a furnace and forehearth to the feeder spout 16. Numerous gas burners (not shown) in the glass feeder 14 can be regulated to form a desired temperature profile in the molten glass 15 as it flows through a feeder channel of the glass feeder 14. Some examples of a feeder may include a Füller-type feeder, a feeder configured for a Vello process, and/or a feeder configured for a Danner process. It will be appreciated that other types of glass feeders may be used within the glass container forming system 10.

In an example, the glass feeder 14 may include a plunger 20 (or needle) for pushing molten glass 15 from the glass feeder 14 and feeder spout 16. The plunger 20 can be carried by the feeder spout 16 and can reciprocate above an orifice ring 18 and along a longitudinal axis aligned with the feeder spout 16. The plunger 20 may include a hydraulic, a pneumatic, an electric, or any other suitable type of actuator. In example, the plunger 20 may include a screw-type plunger.

As illustrated in FIG. 1, the plunger 20 may further include a blow conduit 22 disposed in the radial center of the plunger 20 and aligned along the longitudinal axis. The blow conduit 22 can include a conduit configured for carrying a gas (e.g., air, an inert gas, and the like). The blow conduit 22 can be fluidly coupled to a compressed air source (not shown), for example an air compressor and/or a compressed air tank. Compressed air can be released from the compressed air source to the blow conduit 22 and can exit the blow conduit 22 through an outlet 25 proximate to the orifice ring 18.

The glass container forming apparatus 12 can include the feeder spout 16 at a downstream end of the glass feeder 14. The feeder spout 16 can be configured to dispense molten glass 15 from within the glass feeder 14 and can include the orifice ring 18 proximate to the feeder spout 16 for controlling flow of and/or provide heat to the molten glass 15. In some instances, the orifice ring 18 may include a heating mechanism to control temperature and/or viscosity of the molten glass 15 as it exits from the feeder spout 16. The heating mechanism may include a flame burner, an electrical resistance heater, a microwave heater, or any other suitable heater. An annular space 23 can be disposed between and defined by the plunger 20 and the orifice ring 18, where the molten glass 15 flows between the plunger 20 and the orifice ring 18 through the annular space 23 and from the feeder spout 16 to create a continuous tube 28 (e.g., a hollow and/or tube-like stream of molten glass 15, a string of connected, partially-formed parisons, and the like). The annular space 23 may be adjusted by moving the plunger 20 to adjust the molten glass 15 flow and/or profile.

As the plunger 20 pushes molten glass 15 from the glass feeder 14 and through the orifice ring 18 and feeder spout 16, air from the compressed air source can flow through the blow conduit 22 and into the molten glass 15 to form a continuous tube 28 with a concentric interior and exterior. In this way, the glass feeder 14 and feeder spout 16 can be used to form the tube 28 as a free surface (e.g., without contact from or using a blank mold or other equipment).

At least two die rollers 26 can be disposed directly downstream from the feeder spout 16 and orifice ring 18 with no chutes, scoops, or other gob handling devices therebetween. Each die roller 26 can include a generally circular roller but with individual sides or faces 36 along the circumference (e.g., a polyhedron) that can rotate against at least one other die roller 26 in the direction of flow of the continuous tube 28 with the tube 28 pressed between the die rollers 26. In implementations when multiple die rollers 26 are used, each progressive die roller 26 may include different cavity shapes for progressively forming the continuous tube 28 into parisons and thus into containers. Each die roller 26 can be adjustable and positionable so that as the die roller 26 rotates between faces 36, the die roller 26 can reciprocate along an axis A between the die rollers 26. For example, the die rollers 26 may be moveable along axis A, and a clamp force between the die rollers 26 can be adjustable using a spring, an air cylinder, a servo motor and/or any other suitable device for providing piston and/or force control.

Each die roller 26 can include multiple faces 36, where each face 36 may be planar on a circumference of each die roller 26 and can include at least one cavity 38 for forming a glass container 30 from the continuous tube 28. As the tube 28 is extruded, it can flow between the die rollers 26 and be pressed into the cavities to form a glass container 30. In some embodiments, as illustrated in FIG. 1, a glass container 30 can be formed from the continuous tube 28 with two open ends (e.g., an open top end and an open bottom end). In some embodiments, as illustrated in FIG. 2, a glass container 30' can be formed with only one open end (e.g., an open top end and a closed bottom end with a seal 34).

FIG. 3 illustrates an example of a die roller 26 that can be implemented with the glass container forming apparatus 12. In the example in FIG. 3, the die roller 26 can include a polyhedron having multiple planar faces 36 (e.g., eight) with each face 36 carrying a cavity 38, and each cavity including a cavity opening 37. It will be appreciated that each die roller 26 may include a variety of number of faces 36 (e.g., seven, eight, nine, ten, and so forth). The faces 36 can be approximately the size of the glass container 30 being formed. Each face 36 can be disposed on an outer side 39 and/or edge of the die roller 26 so that as the die roller 26 is rotated, each of the multiple faces 36 contacts and presses against a corresponding face on a corresponding die roller. For example, a set of two die rollers 26 can be configured to rotate against each other so that the continuous tube 28 extruded from the feeder spout 16 can be pressed between the two die rollers 26 to at least partially form a glass container 30 within the cavity 38. In some implementations, the string 32 of connected glass containers 30 can be formed as the tube 28 is continually extruded and the die rollers 26 continuously rotate. In some implementations, the die rollers 26 may be configured to sever the glass containers 30 from the string 32 of glass containers 30. When the glass containers 30 are severed from the string 32, heating of air inside the glass containers 30 due to the high temperature of the glass can be further used to shape the glass container 30.

Each cavity 38 can be in the shape of at least a portion of a desired glass container 30. In the embodiment shown in FIGS. 3 through 5, each cavity 38 can be in the shape of half of the desired glass container 30 so that as the continuous tube 28 is extruded from the feeder spout 16 and between the die rollers 26, a glass container 30 is formed by the cavities 38 as the die rollers 26 rotate against each other. In some instances, the cavity 38 may be configured to form a glass container 30 having a handle and/or a finger hook. In the example illustrated in FIG. 4, the die roller 26 is shown where each face 36 carries one cavity 38. In the example illustrated in FIG. 5, the die roller 26 can comprise a face 36 that carries multiple cavities 38. It will be appreciated that each face 36 and/or cavity 38 can be configured in a variety of shapes and sizes. The die rollers 26 can rotate at the same rate, and the faces 36 and cavities 38 can be synchronized so that the faces 36 and cavities 38 on each respective roller die 26 press against each other at the same time to form the glass containers 30. Rotation of the die rollers 26 can be achieved electronically and/or mechanically. For example, the rotation may be controlled by software controller servo motors, corresponding die rollers 26 may be geared together, corresponding die rollers 26 may be chain driven together and/or by any other suitable means.

Additionally, the glass container forming apparatus 12 may include more than two die rollers 26. For example, FIG. 6 illustrates a top view (e.g., along the path of the flowing continuous tube 28) of an embodiment showing four die rollers 26 for pressing the tube 28. In some embodiments, the die rollers 26 may include faces 36 having cavities 38 with different shapes and/or configurations on the same die roller 26. It will be appreciated that the glass container forming apparatus 12 may include a variety of numbers and configurations of die rollers 26.

In some embodiments, the glass container forming system 10 may include a plurality of corresponding die rollers 26 (e.g., a set) and/or a plurality or series of sets of die rollers 26, where each set can perform a separate or additional shaping operation that results in a string 32 of at least partially-formed glass containers 30. In the embodiment illustrated in FIG. 1, the glass container forming system 10 is shown having two sets of die rollers 26 (e.g., 26a, 26b), although it will be appreciated that one or more than two sets may be implemented. In a specific example, the glass container forming system 10 may include a first set of die rollers 26 that is proximate to the glass feeder 14 for performing a first forming operation (e.g., to form the continuous tube 28 into a first parison shape), a second set of die rollers 26 for performing a second forming operation (e.g., to form the continuous tube 28 into a second parison shape), a third set of die rollers 26 for performing a third forming operation (e.g., to perform a final shaping step resulting in a continuous string 32 of connected glass containers 30), and so forth. In this example, the first set of die rollers 26 may be disposed between the glass feeder 14 and the second set of die rollers 26, and the second set of die rollers 26 may be disposed between the first set of die rollers 26 and the third set of die rollers 26.

Figure 7:
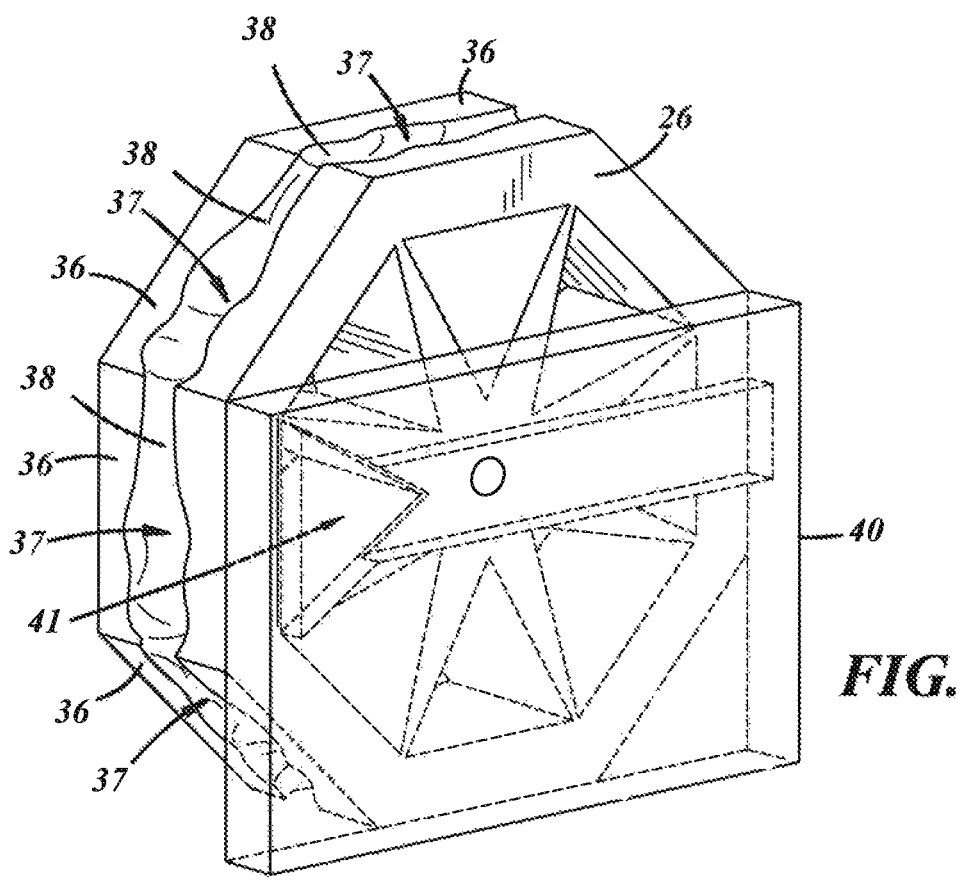
FIG. 7 is an isometric view of a die roller and a vacuum manifold fluidly coupled to the die roller according to an illustrative embodiment of the present disclosure, where the die roller may be used by the glass container forming system and glass container forming apparatus illustrated in FIG. 1.

In some embodiments, the glass container forming apparatus 12 may include a vacuum manifold 40 that is coupled to at least one die roller 26 and configured to provide vacuum to any or all of the cavities 38 and to assist with shaping the glass containers 30. The vacuum can be applied to each respective die roller 26 and cavity 38. As the vacuum is applied, the tube 28 can be pulled against each respective surface of the face 36 and the glass container 30 can be formed. In an embodiment, vacuum may be applied through a stationary vacuum manifold 40 that the die roller 26 passes by such that the vacuum is applied to the surface of the die roller 26 and each face 36 at the appropriate time. For example, FIG. 7 illustrates a stationary vacuum manifold 40 configured to apply a vacuum to a respective cavity 38 as the continuous tube 28 is pressed between the rotating die rollers 26 and into the cavity 38. The vacuum manifold 40 can be coupled to at least one die roller 26 via a kiss-plate 41 that has an opening in each respective die roller 26 at corresponding locations, by way of a rotary union 43 or other means for establishing a fluid connection between a moving and a stationary part.

Figure 8:
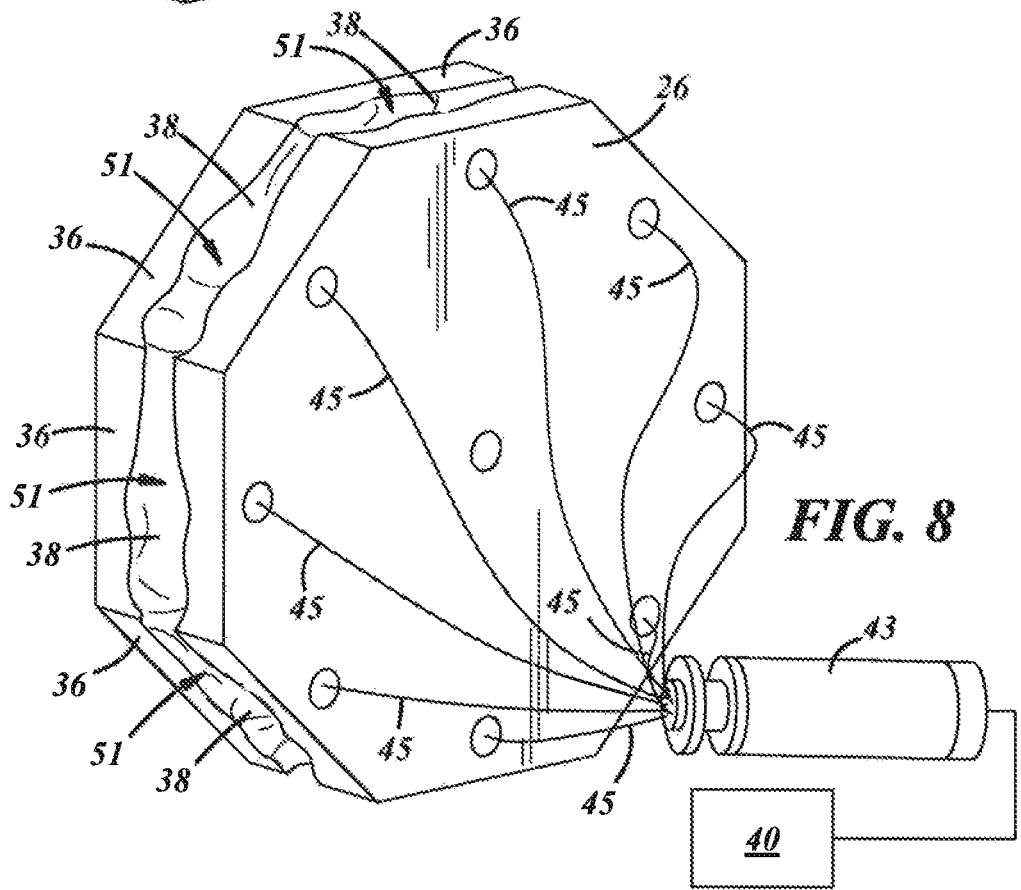
FIG. 8 is an isometric view of a die roller and a vacuum manifold fluidly coupled to the die roller using a rotary union according to an illustrative embodiment of the present disclosure, where the die roller may be used by the glass container forming system and glass container forming apparatus illustrated in FIG. 1.

FIG. 8 illustrates an embodiment showing a die roller 26 coupled to a vacuum manifold 40 by way of a rotary union 43, which can include a device that provides a seal between a stationary vacuum supply passage from the vacuum manifold 40 and a rotating vacuum supply passage to the roller die 26. In this embodiment, the vacuum manifold 40 can be fluidly coupled to the rotary union 43, and a plurality of vacuum hoses 45 can be fluidly coupled to the rotary union 43 and to the roller die 26. Each of the vacuum hoses 45 can be coupled to respective openings in the roller die 26, where each respective opening can correspond to a respective cavity 38 on a respective face 36 of the roller die 28 and provide vacuum to a cavity opening 51 in each of the respective cavities 38. The vacuum may be provided to each cavity opening 51 through a conduit (not shown) in the roller die 26.

Figure 9:
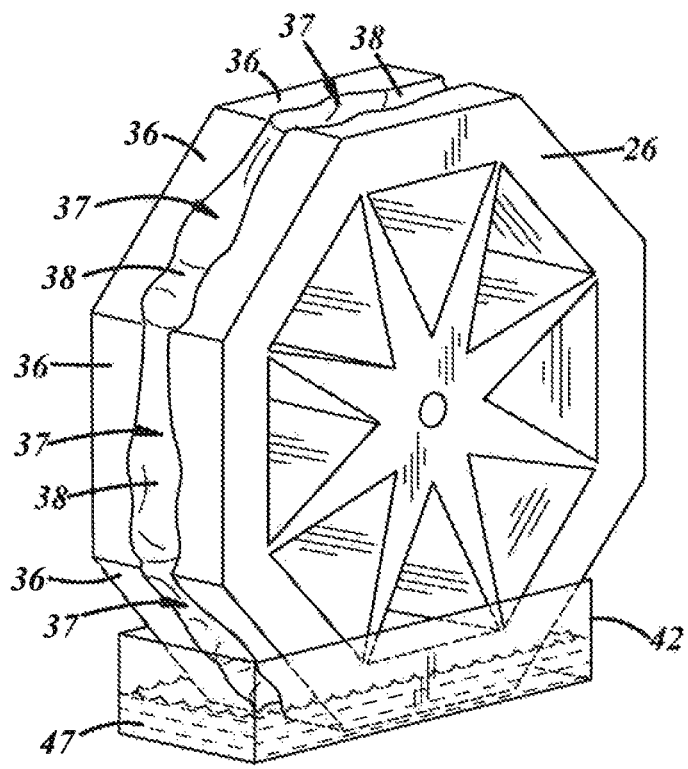
FIG. 9 is a fragmentary elevational view of a die roller and a cooling bath according to an illustrative embodiment of the present disclosure that may be used by the glass container forming system and glass container forming apparatus illustrated in FIG. 1.
Figure 10:
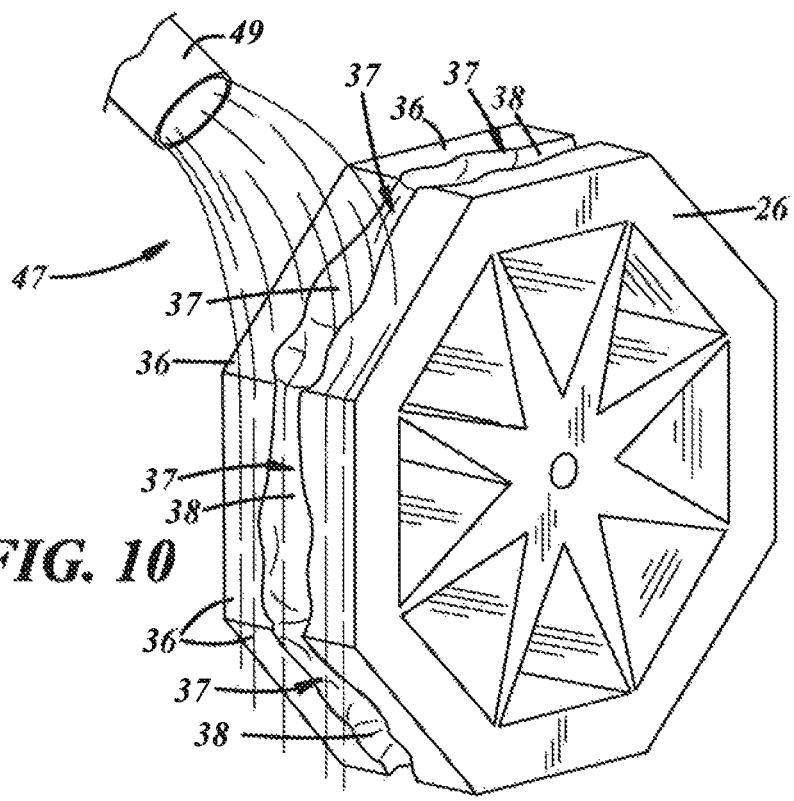
FIG. 10 is an isometric view of a die roller and a discharge device according to an illustrative embodiment of the present disclosure, where the die roller may be used by the glass container forming system and glass container forming apparatus illustrated in FIG. 1.

In some embodiments, the glass container forming apparatus 12 may include a cooling bath 42, a heat exchange medium 47, and/or other means for cooling the die rollers 26 or other components of the glass container forming system 10. Some examples of a heat exchange medium may include water, an antifreeze coolant, air, and so forth. In the example illustrated in FIG. 9, the cooling bath 42 may be disposed below the roller die 26 and may include a heat exchange medium 47 (e.g., a water bath, a pool of water, and the like) through which the die roller 26 may rotate and/or be partially submerged. In the examples illustrated in FIGS. 10 and 11, the roller die 26 may be cooled by a heat exchange medium 47 that flows over and/or is directed toward at least a portion of the die rollers 26. The example in FIG. 10 illustrates a heat exchange medium 47 that flows over the die roller 26 by way of a discharge device 49, for example a discharge pipe (e.g., water or other suitable cooling liquid that forms a waterfall). In the example shown in FIG. 11, the heat exchange medium 47 can be sprayed on and/or directed toward the roller die 26 using the discharge device 49, for example at least one spray nozzle (e.g., for cooling and/or applying lubrication). It will be appreciated that the cooling bath 42, the heat exchange medium 47, and or other cooling means may include other configurations and/or forms.

FIG. 12 illustrates an example of a method 100 for forming a glass container 30 from a tube 28 using die rollers 26. For purposes of illustration and clarity, method 100 will be described in the context of the glass container forming system 10 and the glass container forming apparatus 12 described above and generally illustrated in FIGS. 1 through 7. It will be appreciated, however, that the application of the present methodology is not meant to be limited solely to such an arrangement, but rather method 100 may find application with any number of arrangements (i.e., steps of method 100 may be performed by components of the glass container forming system 10 and glass container forming apparatus 12 other than those described below, or arrangements of the glass container forming system 10 and glass container forming apparatus 12 other than that described above).

In an embodiment, method 100 comprises a step 110 of flowing molten glass 15 to a glass feeder spout 16. In implementations, flowing the molten glass 15 can include moving the plunger 20 along a longitudinal axis within the feeder spout 16 to cause the molten glass 15 to flow directly from the feeder spout 16 towards the die rollers 26. When flowing the molten glass 15, the plunger 20 can be used to at least partially determine the shape and thickness of the tube 28 by adjusting a plunger stroke profile and/or the flow rate of the molten glass 15.

Next, method 100 comprises a step 120 of feeding the molten glass 15 through an annular space 23 disposed between the orifice ring 18 and the plunger 20. In this step, the plunger 20 can be used to push the molten glass 15 through the annular space 23. The annular space 23 can serve to at least partially form the molten glass 15 into the tube 28 (e.g., a hollow and/or tube-shaped form) as it is extruded from the feeder spout 16 of the glass feeder 14. The size and/or shape of the tube 28 may be changed by adjusting the plunger 20 position so that the annular space 23 is larger or smaller. Additionally, feeding the molten glass 15 through the annular space 23 may include heating the molten glass 15 using a heated orifice ring 18 including a heating element (e.g., a resistive heating element).

Method 100 comprises a step 130 of blowing gas through the plunger 20 and blow conduit 22 to form the tube 28. As the molten glass 15 is extruded and flows through the annular space 23 between the plunger 20 and the orifice ring 18, a gas (e.g., compressed air) can simultaneously flow through the blow conduit 22 and into the extruded molten glass 15 to free form the tube 28. The size and/or shape of the tube 28 may be at least partially changed by adjusting the pressure and/or rate of gas flowing through the blow conduit 22.

Step 140 of method 100 comprises die rolling the continuous tube 28 into a continuous string 32 of glass containers. For example, a set of die rollers 26 can rotate and press the continuous tube 28 as it is extruded from the feeder spout 16. As the die rollers 26 press against each other with the tube 28 disposed between the die rollers 26, a portion of the continuous tube 28 can be formed into a glass container 30 by the cavities 38 on each face 36 and the pressing force between the die rollers 26. As the tube 28 is extruded from the feeder spout 16, the die rollers 26 can rotate at a speed matching the rate of the extrusion of the tube 28. In some implementations, and as the die rollers 26 form the glass containers 30 from the tube 28, a string of glass containers 30 can be formed that are interconnected by the tube 28 not formed into glass containers 30. In some implementations, the glass containers 30 may be severed and/or separated by the die rollers 26 and/or the die rolling process.

In one illustrative embodiment, die rolling the continuous tube 28 can include using two die rollers 26 each having eight faces 36 with one cavity 38 per face 36. In another embodiment, die rolling the continuous tube 28 can include using four die rollers 26 each having eight faces 36 with one cavity 38 per face 36. In another embodiment, die rolling can include two die rollers 26 each having twelve faces 36 with two cavities 38 per face 36. It will be appreciated that die rolling the tube 28 may include using any number of die rollers 26 to press and form the tube 28 into glass containers 30. Additionally, die rolling the continuous tube 28 may include using any number or combination of faces 36 or cavities 38 on each die roller 26.

In some instances, method 100 may comprise a step 150 of applying vacuum through the die rollers 26 to assist with shaping the glass containers 30. For example, applying a vacuum can include using a vacuum manifold 40 that is coupled to a die roller 26 and/or at least one cavity 38 of the die roller 26. When applied to the cavity 38, the vacuum can serve to pull and/or move the tube 28 to the surface of the cavity 38 as the tube 28 is pressed and formed by the die rollers 26.

Additionally, method 100 may comprise a step 160 of cooling the die rollers 26 using a cooling bath 42. In an example, the cooling bath 42 may include a water bath, where a portion of a die roller 26 can make contact with and rotate through the water bath. In another example, the cooling bath 42 may include a device, for example at least one spray nozzle, for spraying water on the die rollers 26. In yet another example, the cooling bath 42 may include a spout for directing water onto the die rollers 26. It will be appreciated that cooling the die rollers 26 using a cooling bath 42 may include using other embodiments of a cooling bath 42 and/or using other types of cooling substances.

There thus has been disclosed an apparatus and method for forming glass containers from a continuous tube of molten glass using die rollers that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of forming a glass container, comprising:
   flowing molten glass to a glass feeder spout located immediately upstream of die rollers;
   feeding molten glass through an annular space established between an orifice ring of the glass feeder spout and a plunger of the glass feeder spout;
   blowing gas through the plunger into the molten glass to form a continuous tube of the molten glass; and
   die rolling the continuous tube into a continuous string of glass containers;
   wherein each glass container of the continuous string of glass containers includes at least one open end.

2. The method of claim 1, wherein the die rollers include polyhedrons carrying one cavity on each face.

3. The method of claim 1, wherein the die rollers include polyhedrons carrying more than one cavity on each face.

4. The method of claim 1, wherein the die rollers include two die rollers.

5. The method of claim 1, wherein the die rollers include at least two sets of die rollers.

6. The method of claim 1, wherein feeding the molten glass through the annular space includes using the plunger to propel the molten glass.

7. The method of claim 1, wherein the plunger includes a blow conduit.

8. The method of claim 1, wherein die rolling the continuous tube includes forming a seal on a bottom of each glass container.

9. The method of claim 1, further comprising:
   applying vacuum through the die rollers to assist with shaping the containers; and
   cooling the die rollers by rolling them through a liquid bath.

10. The method of claim 9, wherein the vacuum is applied to at least one of the at least two die rollers through a stationary vacuum manifold such that the vacuum is applied to a first respective cavity of a first respective face of the at least one of the die rollers at a different time than the vacuum is applied to a second respective cavity of a second respective face of the at least one of the die rollers.

11. The method of claim 9, wherein the applying vacuum step includes applying the vacuum via vacuum hoses, each respective vacuum hose coupled to a respective opening in the die rollers, the respective opening corresponding to a respective cavity on a respective face of each die of the die rollers.

12. The method of claim 1, further comprising:
   severing the continuous string of glass containers into individual glass containers.

13. The method of claim 1, wherein the orifice ring includes a heating mechanism.

14. The method of claim 1, further comprising:
   cooling the die rollers by directing a heat exchange medium toward the die rollers via a discharge device.

15. The method of claim 13, wherein the discharge device is a spray nozzle.

16. The method of claim 13, where in the discharge device is a pipe, whereby the heat exchange medium exits the pipe as a waterfall.

17. The method of claim 1, wherein the die rollers are located below the glass feeder spout to receive the continuous tube as it flows downwardly from the glass feeder spout.

* * * * *